United States Patent [19]

Walters

[11] Patent Number: 5,001,658

[45] Date of Patent: Mar. 19, 1991

[54] PIPE LENGTH TALLY SYSTEM

[75] Inventor: William T. Walters, La Marque, Tex.

[73] Assignee: Scan Systems, Inc., League City, Tex.

[21] Appl. No.: 367,866

[22] Filed: Jun. 19, 1989

[51] Int. Cl.$^5$ .......................... G06F 15/20; G01B 3/12
[52] U.S. Cl. ...................................... 364/562; 33/763; 33/792
[58] Field of Search .................. 364/562; 33/529, 763, 33/773, 784, 792, 756

[56] References Cited

U.S. PATENT DOCUMENTS

| | | | |
|---|---|---|---|
| 3,780,440 | 12/1973 | Taylor | 33/756 |
| 4,161,781 | 7/1979 | Hildenbrandt et al. | 364/562 |
| 4,181,959 | 1/1980 | Tateishi | 364/562 |
| 4,181,960 | 1/1980 | Tateishi et al. | 364/562 |
| 4,642,899 | 2/1987 | Fass et al. | 33/763 |
| 4,718,168 | 1/1988 | Kerr | 364/562 |
| 4,747,215 | 5/1988 | Waikas | 33/763 |
| 4,765,063 | 8/1988 | Sing | 33/763 |

FOREIGN PATENT DOCUMENTS

0008611 1/1986 Japan ..................... 33/763

*Primary Examiner*—Parshotam S. Lall
*Assistant Examiner*—Ellis B. Ramirez

[57] ABSTRACT

A system for use in measuring the lengths of individual pipes in a disassembled pipe string and automatically computing and recording the individual lengths and their cumulative total. The system 20 includes a measuring tape 21 on a spool 22 journalled for rotation as the tape is withdrawn therefrom and a system operations controller 48. The controller comprises a shaft encorder 50 for generating an encoded signal of voltage pulses representing the angular rotation of the spool and microprocessor 60 for converting the encorded signal to a data signal representing the length of a pipe P, the pipe number in order of sequence of measurement, and a cumulative total of individual pipe lengths. The data signals are transferable to a memory storage 64 by manual switch from which they are coupled to a visual display 70 and are retrievable for recording by a printer 72. The controller includes reset means 84 for zeroing controller components when the tape is in a most fully wound position and means 86 for selectively and successively deleting the data signal representing the last measured pipe length.

11 Claims, 4 Drawing Sheets

PIPE LENGTH TALLY SYSTEM

FIELD OF THE INVENTION

This invention relates to a tally system for measuring the lengths of individual pipes in a disassembled pipe string and for automatically computing and recording the length of each individual pipe and the total length of pipes which make up the pipe string.

BACKGROUND OF THE INVENTION

The accurate and expeditious measurement of the plurality of pipes or "joints" in a disassembled string of pipe is often times of considerable importance in the petroleum industry and particularly so as such measurements relate to tubing and casing strings which are to be placed downhole in a well bore. It is common practice for making such measurements, to place all of the joints of pipe which make up a pipe string on a pipe rack or racks and to successively measure the individual pipes in a procedure which requires the involvement and cooperation of at least three workers. In this customary procedure, a first worker holds one end of a measuring tape in registry with the end of a pipe, the second worker holds the tape at the other end of the pipe and observes and reads aloud the measured length which is recorded by a third worker. The procedure is repeated for each pipe in the disassembled pipe string and their recorded lengths are subsequently totaled.

SUMMARY OF THE INVENTION

The present invention makes it possible to obtain an expeditious measurement and recording of the lengths of the individual joints of pipe in a disassembled string of pipe and to provide a record and visual display of a running total of the individual lengths with an apparatus and procedure which requires only two workers. The apparatus comprises a flexible steel tape which is spirally wound on a rotary drum journalled for rotation in a tape housing which can be easily held in one hand by a first worker. The tape, at one end, is fixed to the rotary drum, and includes a free end portion which extends through an exit opening in the tape housing and provided with a loop or eyelet which may be grasped by a second worker to pull the tape from the housing and place its free end in registry with one end of a pipe to be measured. The first worker places the tape housing with the tape exit opening disposed toward the pipe directly against the other end of the pipe. The drum, which rotates as the tape is unwound therefrom and withdrawn from the housing to a length corresponding to the length of pipe, is spring-biased by an appropriate spring means to a rotary position wherein the tape is in a fully retracted position, fully wound on the drum except for the free end portion and eyelet thereof which is larger than the tape exit opening and limits the retraction of the tape into the tape housing. The apparatus further comprises an electronic controller mechanism which is placed accessible to the worker handling the tape reel to facilitate his operation of controller switches for effecting the automatic measuring, recording, and visual display of the measured lengths for each pipe together with a cumulative total. A shaft encoder, mounted in an encoder housing fixed to the tape housing, is also provided for counting the rotations of the tape drum by generating electrical voltage pulses of a number proportional to the number of rotations and total angular rotation of the drum. The pulses are delivered to a pulse counter, which is controllable by operation of a switch to unload its count to a microprocessor. The microprocessor is programmed in accordance with a calibration curve to make adjustment for the difference in length of tape corresponding to a rotation of the tape drum as the drum rotates in response to the tape being withdrawn therefrom, so as to calculate a measurement of length which is accurate to at least 0.01 inch. The microprocessor is also programmed to keep track of the number of each pipe in order of sequence, the length for each individual pipe, and to calculate a total length of the pipes as they are sequentially measured. The current pipe number, its length, and total cumulative length of the measured pipes in the pipe string are stored in memory and also transmitted to a liquid crystal display device at least four times per second. The same information which can be obtained for more than one stack of pipes can also be output to a printer which is operatively connected to the microprocessor.

For making a measurement, the device can also be used with a tag line of predetermined length by fastening the free end of the measuring tape in registry with one end of the tag line and the other end of the tag line in registry with the other end of pipe. A precise measurement of pipe length can then be obtained by summation of tag line length and the additional measure of tape necessary to span the length of a pipe section.

DESCRIPTION OF THE PREFERRED EMBODIMENT

Figure 1:
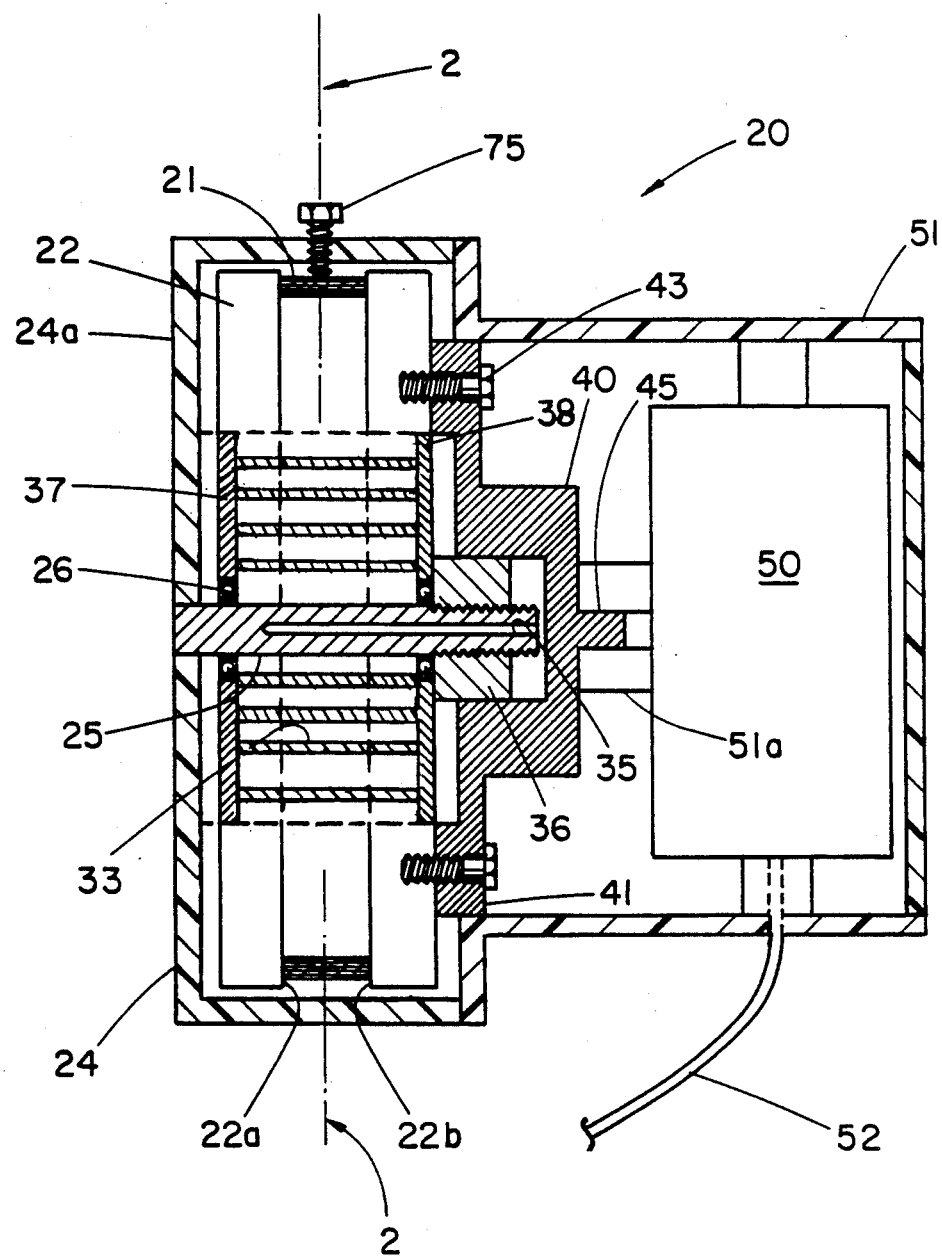
FIG. 1 is a view, partly in section, of the instrument of the invention.

Referring more particularly to the drawings, the tally system 20 of the invention comprises a measuring tape 21 which is wound on a spool or drum 22 and can be unreeled and extended therefrom to effect a length measurement. The spool 22 is enclosed within a tape housing 24 and supported on a central axial shaft 25 for rotation thereon by provision of a journal bearing 26. The shaft 25 is fixed at one end to the wall 24a of the tape housing 24 and is received within the journal bearing 26, the housing of which is also fixed at one end to the wall 24a.

The tape 21 is spirally wound upon itself between the spool flanges 22a, 22b with its inner end fixed to the spool and its other end extending through a slotted tape exit opening 28 in a flat front wall surface 29 provided for the tape housing 24. The free end of the tape is provided with an eyelet 30 of larger dimension than the tape exit opening 28 so that when the eyelet 30 is in abutting engagement with the front wall 29 of the tape housing, the tape is in its most fully wound position on the spool 22.

Figure 2:
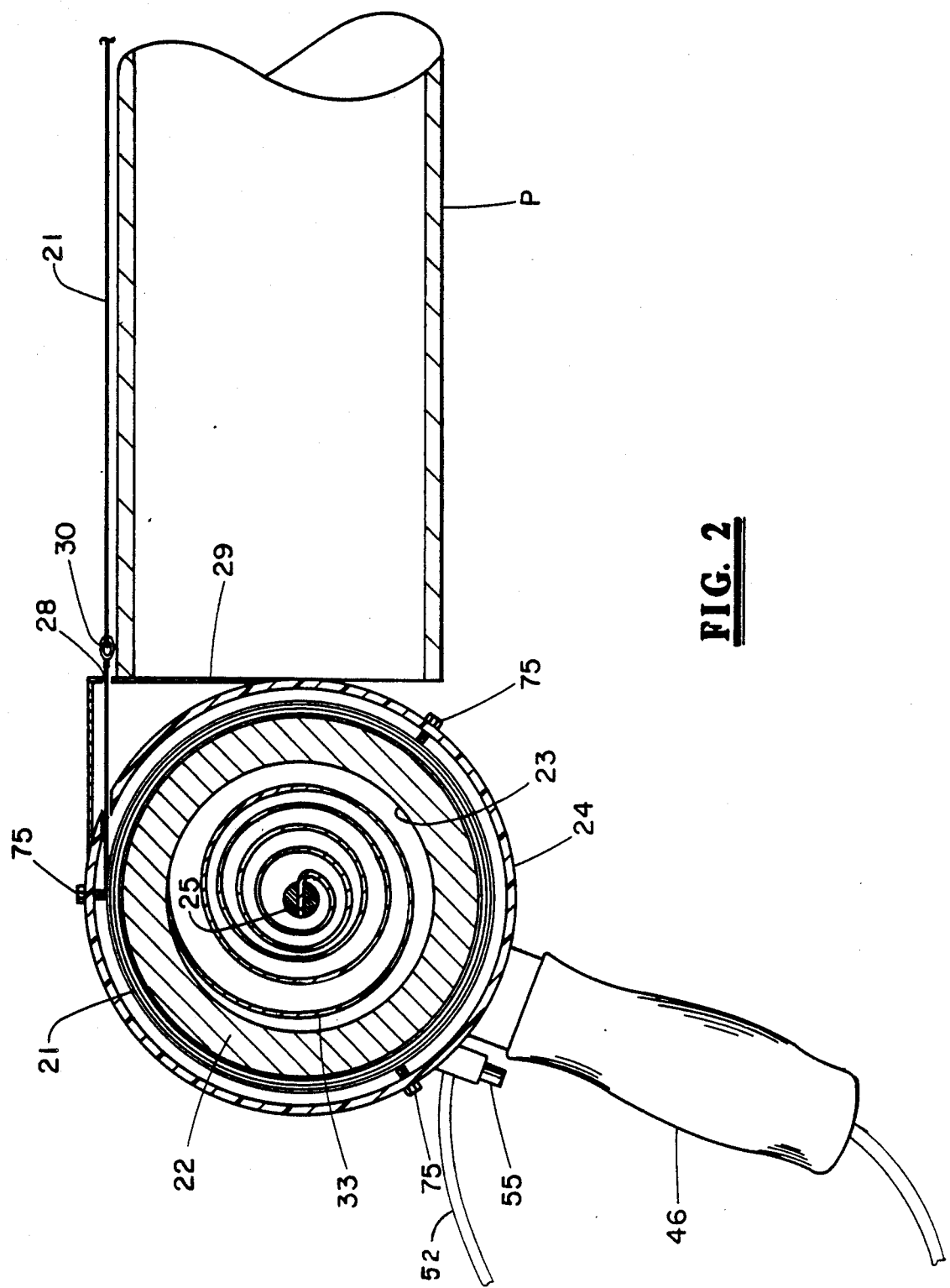
FIG. 2 is a cross sectional view of the instrument of FIG. 1, taken along the section line 2—2 in FIG. 1, but showing the instrument disposed in abutting engagement with an end of a pipe section which is to be measured.

The spool 22 is biased by a spiral spring 33 to a rotary position where the tape 21 is in its most fully wound position on the spool and is fully retracted into the tape housing 24 except for the end eyelet 30. As best seen in FIG. 2, the inner end portion of the spiral spring 33 is received in a slot 35 formed in the shaft 25 and extending axially of the shaft from one end thereof. The inner end of the spiral spring 33 is fixed to the shaft 25 by solder, or otherwise, and its other end is fixed to the inner cylindrical surface 23 of the tape spool 22. Accordingly, as the tape 21 is withdrawn from the tape housing 24 to effect a length measurement, the spool 22 is rotated in the clockwise direction in a number of revolutions corresponding to the extent of tape withdrawn. At the same time, the spring 33 applies a continuing biasing force in the counterclockwise direction so that when the free end of the tape is released, the tape will be retracted to its most fully wound position within the housing 24. At its slotted end, the shaft 25 is externally threaded and provided with an annular spring retainer disk 37 and securing nut 36. A similar spring retainer disk 38 is provided on the shaft 25 on the opposite side of the spring 33.

As best seen in FIG. 1, a cylindrical adapter member 40 provided with an annular flange 41 at one end, is bolted to a side of the tape spool 22 by means of bolts 43 threaded through accommodating bolt holes in the flange 41 and threaded blind bores provided in the side of the spool 22. The adapter 40 includes an external axial projection 45 disposed in coaxial relation with the spool shaft 25.

As best seen in FIG. 2, a handle 46 is provided for the tape housing 24 which is suitable for gripping by one hand whereby an operator can easily carry the tape reel to apply it to one end of a pipe P to be measured while his other hand remains free to perform other functions to be hereinafter described.

Figure 3:
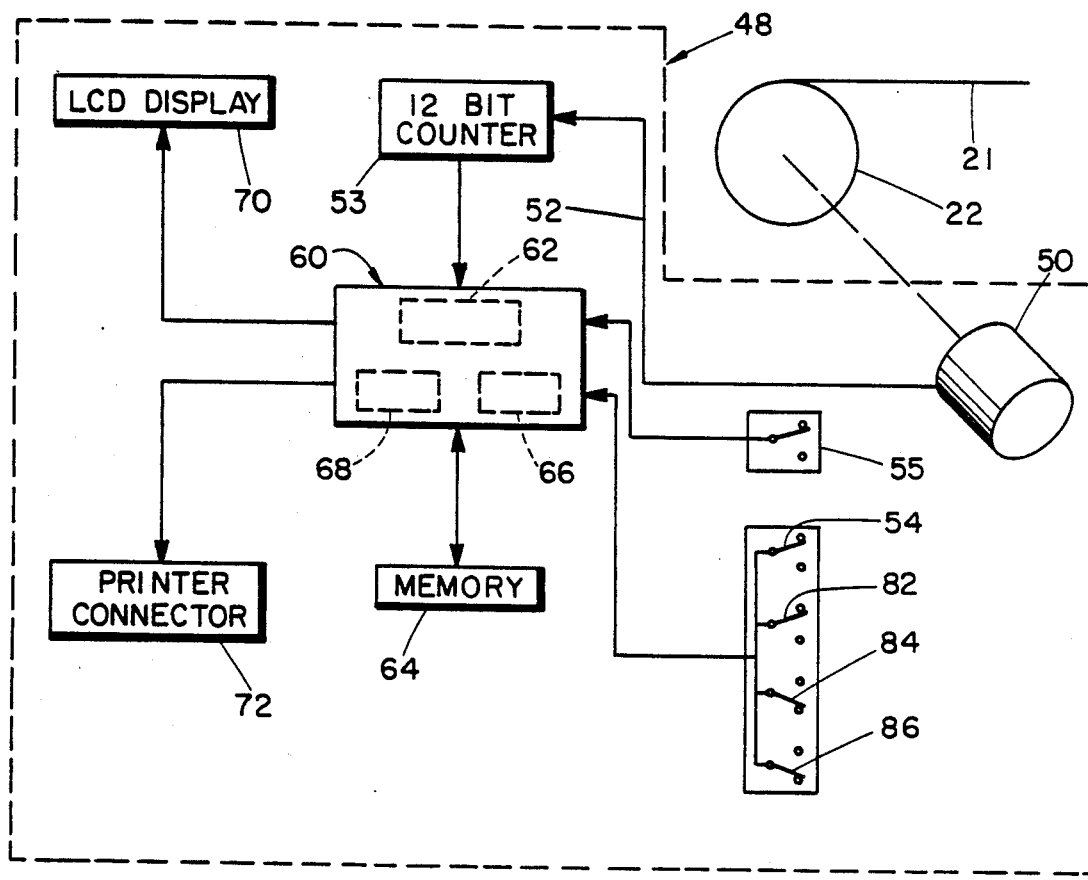
FIG. 3 is a schematic flow diagram illustrating the basic components and functions of the systems operation controller of the invention.

In addition to the tape measure comprising the tape 21 and rotatable spool 22, the tally system of the invention also includes a systems operations controller 48, a function flow diagram of which is illustrated schematically in FIG. 3. The systems operations controller 48 is adapted to provide a user with an automatic read-out and recording of a length measurement as represented by an extension of tape as applied to a pipe to be measured. Also, as will hereinafter be described, it is adapted to provide a user with the current number of the pipe being measured in correspondence to its position in the order of sequence of measurements performed, and a cumulative total length of the individual length measurements as they are sequentially obtained.

The controller 48 comprises a shaft encoder 50 mounted within a housing 51 affixed to the tape housing 24. The encoder 50 includes a portion 51a which is sleeved over the axial projection 45 of adapter 40 and adapted to generate electrical voltage pulses as the projection 45 rotates within. The shaft encoder 51 is of conventional form which encodes the pulses as they are generated to represent the number of revolutions of the tape spool 22 and its total angular rotation produced by the withdrawal of the tape 21 from its housing 24. The voltage pulses from the encoder 50 are delivered by a connecting conductor line 52 to a 12 bit counter 53 for operational processing. The conductor 52 extends from the encoder housing 51 to the handle 46 and out of the bottom of the handle to a housing 56 which is provided for other controller components to be hereinafter described.

The flow diagram in FIG. 3 illustrates the operation of the system controller 48 for making, recording, totalling and displaying measurements. When the apparatus is turned "ON" by the operator's control of an "ON-OFF" switch 54, the shaft encoder 50, in response to rotation of the spool 22, generates and delivers electrical voltage pulses at the rate of 100 pulses per revolution to the 12 bit counter 53 which counts the revolutions and total angular rotation of the tape spool 22 as the tape is unwound therefrom. When a "record" button switch 55 is pressed by the operator, the count is loaded into a microprocessor 60 which includes conversion means 62 for correcting for non-linearities due to changes in circumference from stacking of coils of tape and converting the count to a digital "length" signal representing the length of the measured joint of pipe. The digital "length" signal is immediately stored in memory 64. The microprocessor 60 along with conversion means 62 includes a numbering means 66 for providing a digital data signal representing the current number of a pipe being measured in direct correspondence to its position in order of sequence of measurements. A summation circuit means 68 is also included in microprocessor 60 to receive the output of the signal conversion means 62 so that as individual joints of pipe are successively measured and individual length measurements loaded into memory, the summation circuit 68 generates a digital data signal representing a cumulative total of all previous measurements of individual pipe lengths. When all pipes have been measured a total pipe string length is available.

Accordingly, the length of an individual pipe, the number of the pipe being measured in order of sequence and the running total of all the lengths of pipe joints in the disassembled string of pipe which have been sequentially measured, are represented by microprocessor generated signals. After each pipe is measured, these signals are stored in the memory 64 by the operator pressing the "record" button 55 which is conveniently located on the tape housing handle 46. The microprocessor 60 is also programmed to deliver these data signals representing individual pipe length, current pipe number, and total string length of the measured pipe sections to a liquid crystal display 70. These data signals are delivered four times per second. By means of a printer 72 operatively connected to the microprocessor 60, the operator can press the "print" button 73 which will actuate the printer to automatically "print" out this information.

To effect the measurement of a single pipe, the worker carrying the tape housing places the front wall 29 of the tape housing against one end of the pipe as shown in FIG. 2. The tape is then withdrawn from the housing to be placed by a second worker with its free end in registry with the other end of the pipe. Alternatively and in the most likely manner of use, the free end of the tape will be fixed to one end of a tag line, with the other end of the tag line placed in registry with the end of the pipe to effect the length measurement as will hereinafter be explained.

Normally, all of the pipes which make up a disassembled pipe string are supported on a pipe rack in close juxtaposition. Once a measurement of an individual pipe is completed and recorded, the two workers move the apparatus to the next adjacent pipe to be measured by moving the tag line over against the next adjacent pipe with one worker placing an end of the tag line in registry with one end of the pipe to be measured. With the tape still attached to the other end of the tag line, the worker handling and operating the measuring device of the invention, then places the shoulder provided by the front wall 29 of the tape housing against the end of the pipe as shown in FIG. 2. Again by pressing the "record" button, the microprocessor converts the count of shaft encoder pulses to a digital length signal, computes the cumulative total length, and sends this information along with the sequence number of pipe to memory, the liquid crystal display, and to the printer on command.

The process is then repeated for all the pipes which make up the disassembled pipe string to obtain a total length of pipe string. After the string data is printed, the system is reset to zero with all the tape fully retracted in which condition the apparatus is ready for beginning a new series of measurements.

Figure 4:
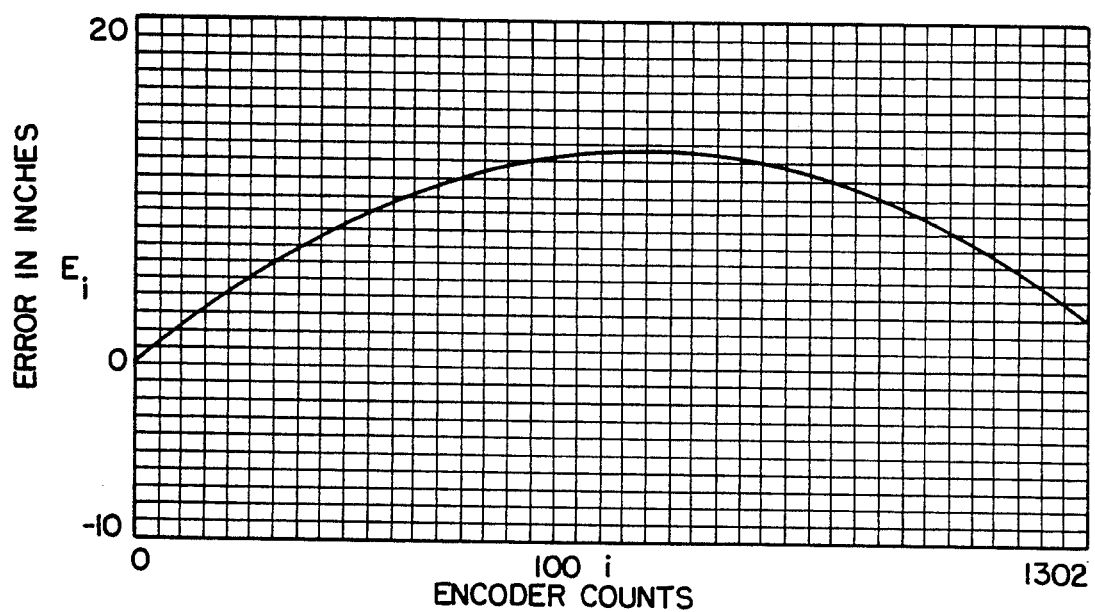
FIG. 4 is a graphical illustration of tape length deviation from a median length per turn in accordance with the number of turns of the measuring tape stored on a rotary tape spool of the instrument of the invention.

The tally system of the present invention is designed to provide accuracy in measurement approximating 0.01 foot. In this regard, the signal conversion means 62 is designed to compensate for spool non-linearities and the fact that a length of tape corresponding to one revolution of the tape spool is of decreasing dimension as the coils of tape being unwound decrease in radial dimensions nearer to the hub of the spool. Accordingly, the conversion means 62 is designed to compensate for these differences in accordance with a calibration curve as shown in FIG. 4 which is a graphical illustration of the error or deviation of a tape length of a turn of tape from a median length plotted as cumulative error against the number of turns of tape on the spool. In the plot of FIG. 4, the encoder court 1302 corresponds to the twelfth turn of tape farthest from the spool hub and i=the number of counts. The curve of FIG. 4 is appropriate when using a drum radius of 1.87 inches and tape thickness of 0.01 inches and is representative of curves obtained when using a different tape thickness or drum radius. While the calibration curve function of FIG. 4 is a convenient tool for effecting a compensation technique, it should be noted other means might be employed, such as fixed measurement decreases for each successive turn.

It is also to be noted that a plurality of tape guides are provided for the tape housing which insure that the tape is tightly wound upon itself when fully retracted in the tape housing. The tape guides are in the form of a plurality of screws 75 which extend through the wall of the tape housing 24 in a radial direction toward the axis of the spool. The screws 75 are equiangularly spaced with reference to the spool axis and are at least three in number.

It is also to be understood that in lieu of a tape which is wound upon itself in ever increasing radii, it is possible to use a wire as the measuring element wherein the wire is wound tightly on the drum in a single layer of adjacent turns and every turn is of equal length, such as one foot. In such case, there would be no difference in length per turn and no error or deviation in the lengths of the turns of wire as the drum is rotated to extract or retract the measuring element.

It is readily apparent that the measuring system described herein could be used for applications other than measuring the lengths of pipe sections in a pipe string intended for use in a well bore. The measuring tape could easily be forty feet in length or more, of light weight cloth or fabric, such that it can be easily carried in one hand. However, for the measurement of a series of pipes which make up a pipe string to be placed in a well bore, which is its principal intended application, it is preferred that a stainless steel measuring tape be used and that it be used in conjunction with a tag line of predetermined length only slightly less than the nominal length of pipe to be measured. Since such pipe is approximately forty feet in length, a 30 ft. or 35 ft. tag line would be an appropriate selection. Accordingly, a tape ten to twelve feet in length provided for the spool 22 is then suitable for use in adding to the 30 to 35 ft. tag line to obtain a precise measurement of a pipe length. In addition, such a tape length allows for a tape having a spool wound diameter of approximately four to five inches and such weight that the instrument housing which encloses the spool and shaft encoder can easily be carried in one hand. With the other hand, the operator can easily work the switches on the front of the controller housing and the "record" button on the handle for the tape spool housing.

Figure 6:
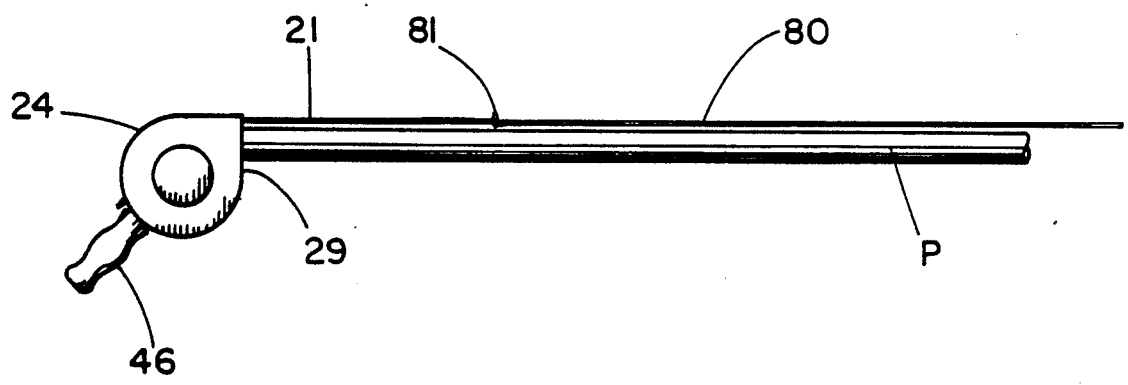
FIG. 6 is a perspective view, showing the apparatus of the invention, being used in conjunction with a tag line of predetermined length.

Whenever a tag line is used, it is preferred that it be a stainless steel cable such as cable 80 in FIG. 6 having a hook 81 on one end for permitting ready attachment to the eyelet 30 on the free end of the measuring tape. The other end of the tag line may be provided with another hook or fitting (not shown) whereby the second worker in a measuring procedure can easily place one end of the tag line in registry with the end of a pipe being measured.

Figure 5:
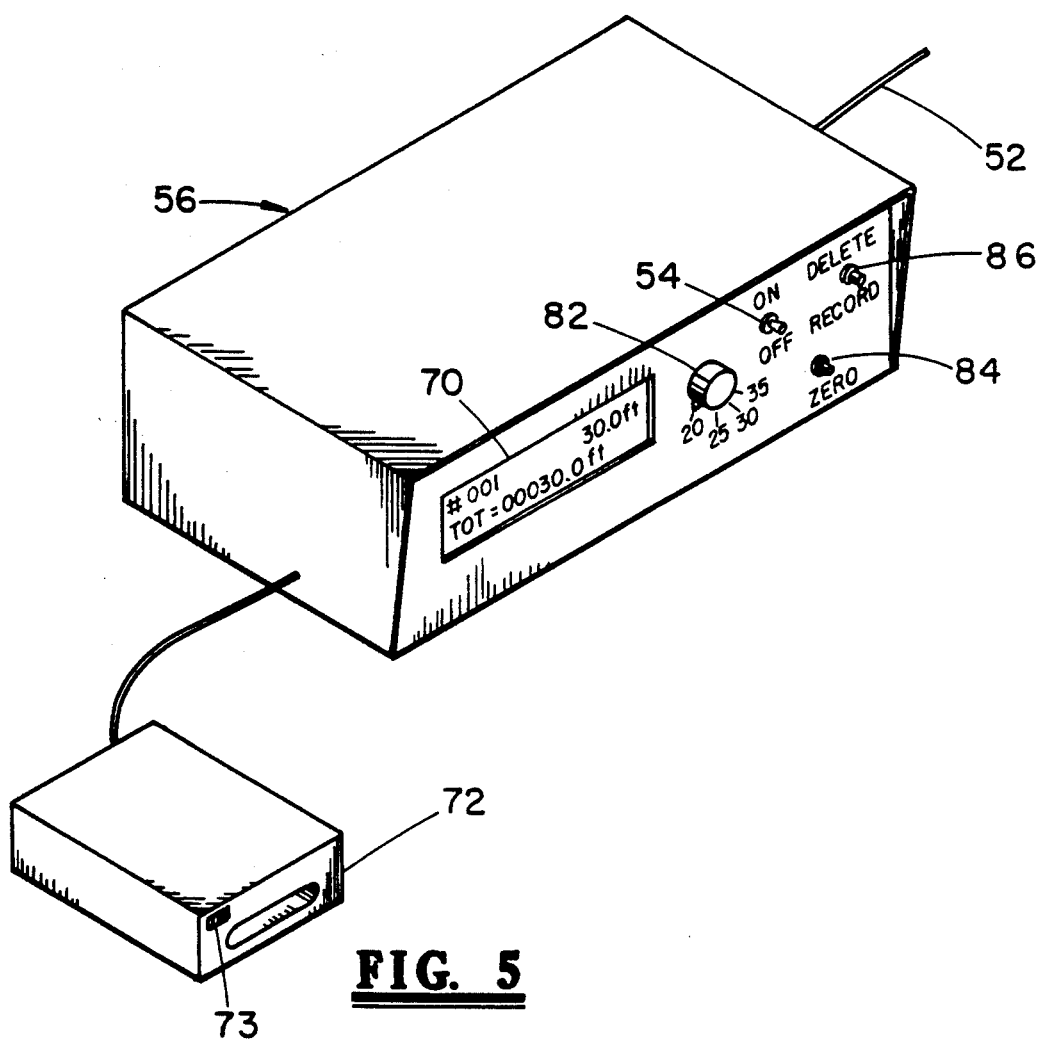
FIG. 5 is a perspective view of the system operations controller of the invention which contains a visual display means and associated panel switches.

Since any number of tag lines of different lengths could be selected for operation with the tally system of the invention, the controller 48 is adapted to accommodate tag lines of twenty, twenty-five, thirty and thirty-five feet. Accordingly, a tag line selector switch 82 is provided on the front panel of the controller housing as shown in FIG. 5. For whatever tag line is selected, the microprocessor adds the selected tag line length to the length of measuring tape withdrawn from the spool and generates a digital data signal representing the length of an individual pipe. The selector switch 82 can be provided with any number of tag line lengths to select which might also include a zero length.

The ON-OFF switch 54 is also located in the front panel of the controller housing in addition to a "ZERO" switch 84 and a "Delete-Record" switch 86. By pressing the "ZERO" switch when the tape is in its fully retracted position, the system controller components can be reset to a zero condition to zero any counter or encoder errors. Also, by pressing the "Delete-Record" switch 86 the operator can selectively delete and erase from memory the digital data signal representing the last measurement of an individual pipe length and the last cumulative total. By successive operation of the "Delete-Record" button, the measurements may be successively deleted in reverse order of measurement.

It will therefore be seen that a unique pipe tally system is described herein which makes it possible to obtain an expeditious measurement and recording of the lengths of individual pipes in a disassembled pipe string and to provide a record and visual display of the individual pipe lengths together with a cumulative total string length in a procedure which requires only two workers for a very short time as compared to conventional procedures. Although the system is particularly designed for measuring pipes it is possible to use the system for measuring lengths and cumulative length of other objects.

It is also to be understood that the foregoing description of a preferred embodiment of the invention has been presented for purposes of illustration and explanations and is not intended to limit the invention to the precise form disclosed. For example, the type of display and recorder could be other than disclosed herein. It is to be appreciated therefore that changes may be made by those skilled in the art without departing from the spirit of the invention.

I claim:

1. A tally system for use in measuring the lengths of individual pipes in a dissassembled string of pipe and for automatically computing and recording the length of each individual pipe and the cumulative total length of the pipes in the string as they are successively measured, said system comprising:

an elongate flexible measuring element spirally wound upon itself in coils of ever-increasing radii on a spool which is supported and journalled for rotation whereby said measuring element can be withdrawn therefrom to a length sufficient to effect the length measurement of a pipe;

means for retracting the measuring element after a measurement and returning the spool to a zero rotary position wherein said measuring element is in a most fully wound position on said spool;

a controller mechanism including signal generating means for generating an electrical signal representing the total angular rotation of said spool effected by the unwinding of said measuring element from said spool as it is withdrawn from the spool;

a microprocessor in said controller mechanism having means for converting said electrical signal to a first digital data signal representing the length of a pipe as measured by said measuring element and corrected for nonlinearities due to changes in circumference of the coils of the flexible measuring element from stacking of its coils on said spool;

means in said microprocessor for indicating the number of the individual pipe being measured by a second data signal which represents its sequence position in the order of successive measurements made with said tally system;

means in said microprocessor for producing a third data signal representing a cumulative total of the individual pipe lengths which have been successively measured;

memory storage means for storing digital data signals;

switch means selectively operable for transferring said data signals from the microprocessor to said memory storage means; and means for producing a visual display of said data signals.

2. The tally system as set forth in claim 1 wherein said switch means for transferring the data signals to the memory storage means also conditions said microprocessor for producing new data signals upon effecting another length measurement of another pipe in the disassembled pipe string, wherein said new data signals represent the new measured length of said other pipe, the number of said other pipe being currently measured which represents its sequence position in the order of successive measurements, and the cumulative total length of the individual pipes which have been successively measured.

3. The tally system as set forth in claim 1 further including reset means which is selectively operable when said measuring element is in its most fully wound, fully retracted position for resetting said system to a condition representing a zero length measurement.

4. The tally system as set forth in claim 1 wherein said microprocessor further includes means which is selectively operable for deleting from said system memory storage means the last length measurement data signal pertaining to the last individual pipe measurement and for selectively deleting the immediately preceding length measurement data signals of previously measured individual pipes in reverse order of their successive measurements.

5. The tally system as set forth in claim 1 wherein said signal generating means is a shaft encoder for generating a series of encoded electrical voltage pulses of a number corresponding to the number of revolutions and total angular rotation of the spool.

6. The tally system as set forth in claim 3 which includes a bit counter coupled to the shaft encoder for receiving and counting said series of encoded voltage pulses.

7. The tally system as set forth in claim 1 wherein said flexible measuring element is a tape.

8. The tally system as set forth in claim 1 wherein said flexible measuring element is a wire.

9. The tally system as set forth in claim 1 wherein said spool is supported and journalled for rotation within a housing, said housing having an exit opening through which said measuring element can be withdrawn therefrom to a length sufficient to effect the length measurement of a pipe when the housing is oriented with its exit opening facing one end of the pipe and the housing is placed against the end of the pipe.

10. The tally system as set forth in claim 1 further including means operatively connected to said microprocessor and selectively operable to obtain a printed record of said data signals.

11. The tally system as set forth in claim 1 wherein said means for connecting said electrical signal representing total angular rotation of the spool to correct for nonlinearities due to changes in circumference of the coils of flexible element on the spool includes means for compensating for the deviation of a tape length of a turn of tape from a median length of the turns of tape in fully retracted position on said spool.

* * * * *